Sept. 9, 1958     L. A. DURKAN     2,851,023
VARIABLE VALVE TIMING
Filed April 26, 1956     2 Sheets-Sheet 1
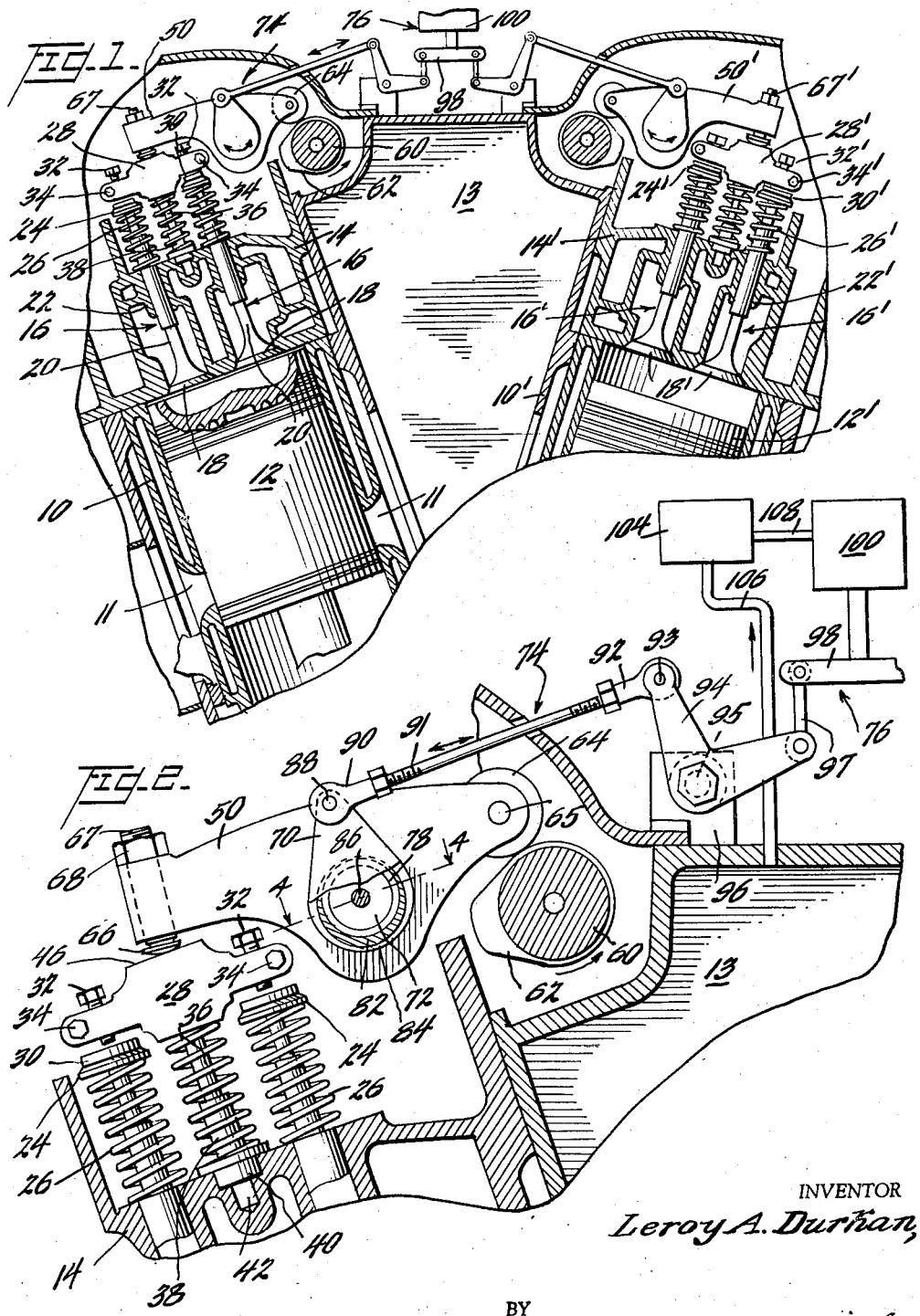
INVENTOR
Leroy A. Durkan,
BY
B. L. Zangaill
ATTORNEYS

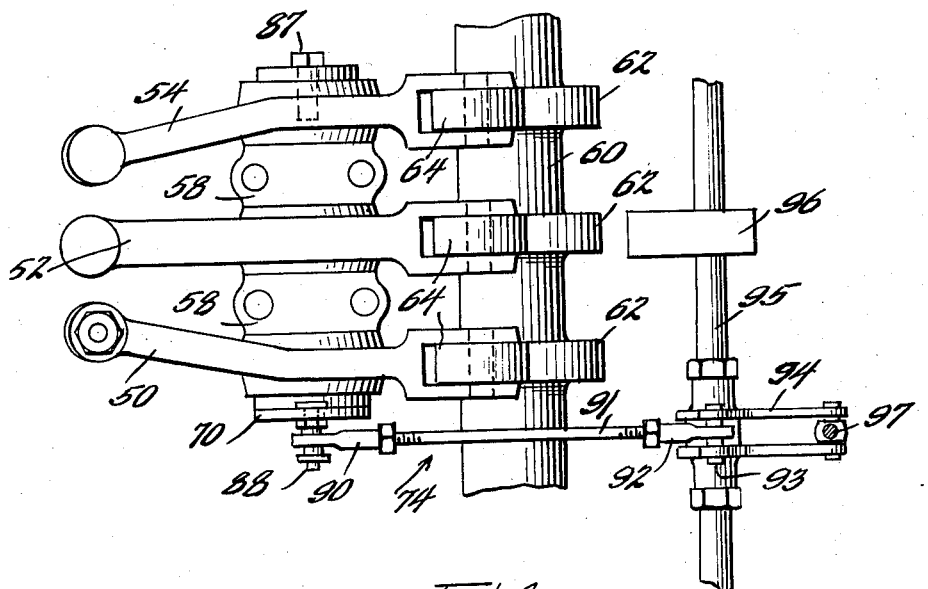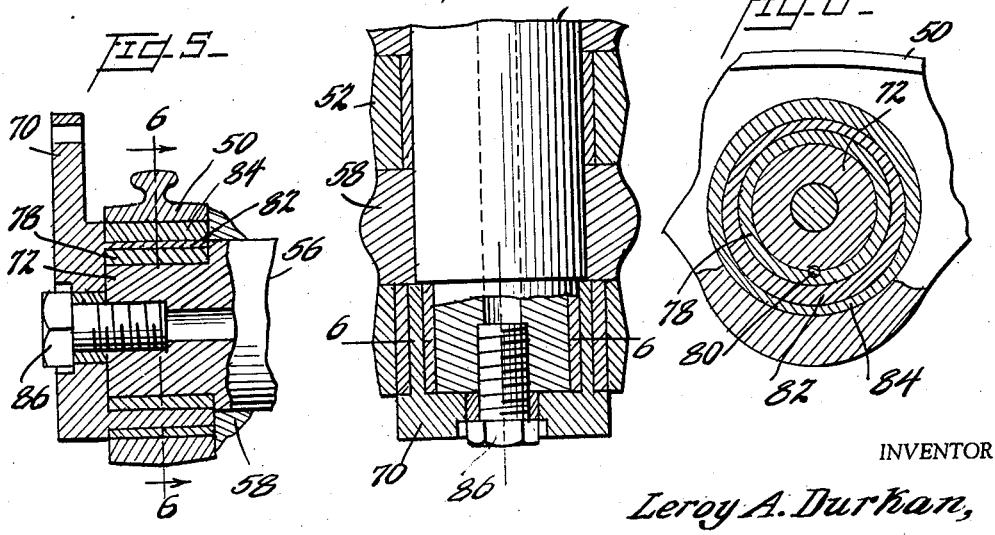

— 2,851,023

VARIABLE VALVE TIMING

Leroy A. Durkan, Annapolis, Md.

Application April 26, 1956, Serial No. 580,971

6 Claims. (Cl. 123—90)

(Granted under Title 35, U. S. Code (1952), sec. 266)

The invention described herein may be manufactured and used by or for the Government of the United States of America for governmental purposes without the payment of any royalties thereon or therefor.

This invention relates to valve operating mechanisms for internal combustion engines, and more particularly to valve operating mechanisms for diesel engines.

In the operation of conventional diesel engines, whether they be two-stroke cycle or four-stroke cycle, the timing of the opening and closing of the valves, both intake and exhaust and of the injection of fuel into the combustion chamber relative to each other and to the crankshaft angle is substantially constant regardless of operating conditions, such as, load, speed, pressures of compressed air in the air box, compression ratios, pressures in the combustion chamber, quality of fuel and the like.

For example with a conventional heavy-duty, multi-cylinder, two-stroke diesel engine, the upstroke of the piston compresses air previously admitted to the cylinder. Fuel oil injection occurs when the piston nears the top of the stroke. The hot gases expand against the piston, forcing it downward on the power stroke. When the piston nears the bottom of the power or expansion stroke, the exhaust valves in the top of the cylinder open. The hot burned gases rush past the valves, and as the piston moves further downward, the intake air ports in the cylinder wall near the lower end are uncovered. Intake and exhaust take place at the same time. Fresh air enters through the intake ports at the lower end of the cylinder forcing burned gases out the exhaust valves at the top of the cylinder and fill the cylinder with fresh air. The exhaust valves then close and the engine is ready to start another cycle. These events of compression, injection, expansion, and exhaust and intake take place in the same timed relation relative to each other, to the stroke of the piston and to rotation of the crankshaft, regardless of varying operating conditions of the engine. Thus, with the conventional diesel engine, there are no provisions for regulating compression rates, for controlling compression and peak pressures in the combustion chamber at different loads or speeds, or of utilizing fuels of different grades to their best advantage.

It is therefore an over-all object of this invention to improve the operating efficiency of diesel engines.

A further object of this invention is to provide regulated compression ratios in diesel engines.

A further object of this invention is to control compression and peak pressures in the combustion chamber of a diesel engine at any load or speed.

A further object of this invention is to aid in the starting of diesel engines.

A still further object of this invention is to provide for lower fuel consumption in diesel engine operation.

A still further object of this invention is to provide for the use of different and less expensive fuels in diesel engines.

A more specific object of this invention is to prevent the overloading of supercharged diesel engines.

Broadly, in accordance with this invention there is provided a means for adjusting the time of opening and closing the exhaust valve or valves of a diesel engine while such engine is operating.

Specifically, in accordance with this invention, the rocker arm, or arms as desired, for operating the exhaust valves for each cylinder are each mounted on an eccentric in a manner that the rocker arms are not only oscillated by the camshaft in the usual manner, but they are mounted for substantially linear movement toward and away from the camshaft. With this arrangement, the cam follower mounted on one end of the rocker arm is moved in substantially a straight line tangent to the camshaft so that the center line position of the cam follower may be changed fore and aft around the base diameter of the camshaft. Movement of the eccentric, and through it the rocker arm, will regulate when the exhaust valve will open and close in relation to the crankshaft angle. Movement of the rocker arm in one direction will cause the exhaust valve to open and close early relative to the stroke of the piston. Whereas, movement of the rocker arm in the opposite direction will cause the exhaust valve to open and close late relative to the stroke of the piston. The time interval between the opening and closing of the exhaust valve is not changed. Also, there is no change in the time of opening and closing of the intake valve or in the injection of fuel into the combustion chamber.

The external adjustment of the eccentric, and through it the rocker arm, may be manually operated, as by a linkage connected thereto and leading to a graduated, threaded adjustment on the control panel of the engine. However a preferred embodiment of the invention includes an automatic adjustment operated by a servomotor, which in turn is operated responsive to the pressure of compressed air in the air box of the engine. This adjustment takes place automatically while the engine is running.

Briefly, in operation, when the pressure of compressed air is low in the air box, as at startup, the rocker arm is adjusted in a manner that the exhaust valve, opens early and closes early relative to the stroke of the piston. Thus, by the early opening of the exhaust valve, the expansion of the hot gases is not utilized to its fullest extent, but the early closing of the valve permits the trapping of a greater volume of low-pressure air so that compression ratios are higher at startup, than with the conventional diesel. Conversely, after the engine has been operating a sufficient length of time to build up a relatively high pressure in the air box, the rocker arm is automatically shifted in the opposite direction whereupon the exhaust valve is opened and closed late relative to the stroke of the piston. With this late opening of the exhaust valve, the expansion of the hot gases is used more efficiently, there is less loss of unburned fuel, the effective power stroke is lengthened, and the late closing of the exhaust valve permits a greater quantity of fresh air to pass through the cylinder resulting in more complete scavenging of the cylinder. Furthermore, the late closing of the exhaust valve, reduces the volume of the now high-pressure air that is trapped for compression in the cylinder thereby preventing the overloading of the engine. This latter feature is particularly desirable with supercharged diesel engines.

Thus, in accordance with the instant invention, this variable valve timing affords a regulated compression ratio, resulting in controlled compression and peak pressure in the combustion chamber at any load and speed, aids in the starting of the engine, gives lower fuel consumption, permits the use of different and less expensive fuels, and prevents overloading of the engine.

The above and other objects and advantages of the invention will be more apparent from the following description and accompanying drawings, which illustrate a preferred embodiment, and wherein:

Fig. 1 is a transverse vertical section through an upper portion of a V-type diesel engine and showing a valve operating mechanism in accordance with this invention;

Fig. 2 is a partial transverse section similar to Fig. 1, on an enlarged scale;

Fig. 3 is a top plan of a valve operating mechanism incorporating this invention;

Fig. 4 is a longitudinal horizontal section taken on line 4—4 of Fig. 2;

Fig. 5 is a longtiudinal vertical section taken on line 5—5 of Fig. 4; and

Fig. 6 is a transverse vertical section taken on lines 6—6 of Figs. 4 and 5.

Referring now to the drawings, first to Fig. 1, which illustrates an application of the invention to a pair of cylinders of a diesel engine provided with a plurality of such pairs of cylinders. Only so much of the diesel engine as is necessary for a complete understanding of the invention and only the valve mechanism for one cylinder, the left-hand cylinder (Fig. 1), will be described in detail. The valve mechanism for right-hand cylinder and components thereof are the same as for the left-hand cylinder, and are given like reference numerals primed.

With reference to the left-hand portion of Fig. 1, reference numeral 10 indicates a cylinder, having a reciprocating piston 12 therein and a cylinder head 14 attached thereto. The cylinder head carries two pairs of exhaust valves 16, only one of which pairs is shown. As with conventional diesel engines of the type disclosed, the cylinder 10 is provided with the usual intake air ports 11 in the lower portion of the cylinder wall, which air ports are in open communication with an air box 13 located in the V of the engine casting, and which air ports are covered by the piston during its upward stroke and uncovered near the end of its downward stroke. Also, as with conventional diesel engines, the piston is connected to a crankshaft by a connecting rod and the crankshaft is connected to a camshaft, to be referred to in detail hereinafter, which camshaft is thereby rotated in timed relation to the stroke of the piston. Since these elements, per se, are not a part of the instant invention, there is no need for their being illustrated or described in detail.

Each of the exhaust valves 16 includes the conventional valve head 18, stem 20, valve guide 22, tappet contact member 24 and compression spring 26, which compression spring biases the valve to closed position. Mounted above the valves in suitable guides, not shown, is a valve bridge 28. The valve bridge is provided with a pair of conventional tappets 30, adjustably mounted on the bridge by a pair of set screws 32 held in adjustment by a pair of lock screws 34. The bridge is provided with a stem 36, which, in accordance with this invention, reciprocates in a guide sleeve 38. The guide sleeve has a cylinder portion 40 on the lower end thereof, which fits, as by a shrink fit, into an opening in the cylinder head. So as to permit reciprocation of the valve bridge, the cylinder head is provided with a cavity 42 directly beneath the bridge stem. A compression spring 44 surrounds the bridge stem and maintains the set clearance between the valve tappets and the tappet contact members. The compression spring 44 also maintains the cam follower in contact with its cam, as described hereinafter. In accordance with this invention and for reasons pointed out hereinafter, the valve bridge 28 is provided with a flat polished surface 46 on the top portion thereof.

Referring now to Fig. 3, a set of three rocker arms 50, 52 and 54 is mounted on a shaft 56 (Fig. 4), which shaft is held within a pair of brackets 58 mounted on the cylinder head. The rocker arm 50 operates the exhaust valves 16, shown in Figs. 1 and 2, and will be referred to in more detail hereinafter. The rocker arms 52 and 54 are conventional in that the former operates a fuel injector, not shown, and the latter operates the second pair of exahust valves, not shown. A similar set of rocker arms is provided for each cylinder of the multi-cylinder engine. A cam shaft 60, provided with a plurality of cams 62, one for each rocker arm, is mounted on the engine casting and is connected in a conventional manner with the engine crankshaft, not shown. Each of the rocker arms is bifurcated at one end thereof for the reception of a cam follower or roller 64, which roller is journaled on a pin 65 in the bifurcated end of the rocker arm. The opposite end of rocker arm 50, in accordance with this invention, is provided with a slider 66 (Fig. 2) mounted on an adjustable stem 67, held in adjustment by a nut 68. The sliding contact between the slider 66 and the polished top surface 46 of the valve bridge permits the rocker arm 50 to be moved in substantially a horizontal plane relative to the camshaft, for reasons pointed out hereinafter.

In accordance with this invention, the rocker arm 50 of each set of rocker arms is provided with means for adjusting the position of the center line of the cam follower relative to the camshaft to thereby regulate the time of opening and closing of one pair of exhaust valves for each of the cylinders of the multi-cylinder engine relative to the crankshaft angle of such engine. This adjusting means includes an eccentric adjustment lever 70, Figs. 2 and 5, mounted on a reduced end 72 of the rocker arm shaft 56 and connected by a linkage 74 to an operating mechanism 76, each to be referred to in detail hereinafter.

Referring now to Figs. 4, 5 and 6, the reduced end 72 of the rocker arm shaft is provided with a bronze sleeve or bearing 78 held in place by a pin 80. Mounted upon the bearing 78 is a first eccentric sleeve or cam 82 and mounted on this eccentric sleeve is a second eccentric sleeve or cam 84. The first eccentric sleeve 82 forms an integral part of the lever 70, while the second eccentric sleeve 84 forms a bearing upon which the rocker arm oscillates. As shown in Fig. 6, the high and low portions of the outer surface of eccentric sleeve 82 are diametrically opposite each other and are in contact with the low and high portions, respectively, of the inner surface of eccentric sleeve 84. This is the intermediate position of the eccentric lever, as described hereinafter. The reduced end 72 of the rocker arm shaft is drilled and tapped to receive a set screw 86, which set screw holds the eccentric lever 70, the rocker arm 50 and the eccentric sleeves 82 and 84 on the reduced end of such shaft. As shown in Fig. 3, the opposite end of the rocker arm shaft is drilled and tapped to receive a set screw 87 for holding the rocker arm 54 in place thereon.

The upper end of the eccentric lever 70 is drilled to receive a pin 88 (Fig. 2), which pin has mounted thereon one end 90 of a connecting rod 91, the opposite end 92 of which connecting rod is attached by a pin 93 to a first bifurcated end of a bell crank 94, which bell crank is keyed to a shaft 95 and which shaft in turn is mounted for rotation in suitable bearings 96 attached to the engine casting. As shown, the effective length of the connecting rod 91 is adjustable. A second bifurcated end of the bell crank is connected by a link 97 to a yoke 98 of a servomotor 100. The servomotor, which may be of any suitable type, is shown here for purpose of illustration as being operated by compressed air derived from a conventional air box 13, Figs. 1 and 2. The air box 13 which is in open communication with the intake ports 11 of the cylinder is supplied with compressed air by a supercharger driven from the crankshaft of the engine. Mounted alongside the servomotor is a control mechanism, indicated generally by reference numeral 104, which mechanism is connected to the air box by a conduit 106 and to the servomotor by a conduit 108.

In operation, with a decrease in pressure of compressed air in the air box 13, the yoke 98 of the servomotor, through the control mechanism, is moved upward (Figs. 1 and 2) relative to the servomotor, whereupon the bell crank 94 is rotated counter clockwise which, through the connecting rod 91, rotates the eccentric lever counter clockwise. Counter clockwise rotation of the eccentric lever, through the eccentric sleeve 82 thereon, and the eccentric sleeve 84 within the rocker arm 50, causes the rocker arm to move to the right (Figs. 1 and 2), which movement causes the cam follower to move to the right and in position for early contact by the cam 62. This early contact of the cam follower by the cam causes the exhaust valves to open and close early relative to the stroke of the piston 12. Conversely, with high pressure of compressed air in the air box, the yoke 98 is moved downward relative to the servomotor, resulting in clockwise movement of the bell crank and eccentric lever and left-hand movement of the rocker arm and attached cam follower relative to the cam. This later movement of the rocker arm causes the exhaust valves to open and close late relative to the piston stroke. As stated heretofore, the time interval betweeen the opening and closing of the exhaust valves is constant, regardless of whether they are opened early, late or therebetween.

It is to be noted that the operating and control mechanism for the exhaust valves 16' for the right-hand cylinder 10', Fig. 1, is the same as that described above for the left-hand cylinder, except that the direction of motion of the operating mechanisms is reversed. Also, while Fig. 3 shows but one set of rocker arms and operating mechanisms therefore, a similar set of rocker arms and operating mechanisms are provided for each of the cylinders of the multi-cylinder engine. That is, at least one pair of exhaust valves for each cylinder is regulated in the manner described above. Although, in practising the invention, it has been found that the regulation of the timing of one pair of exhaust valves for each cylinder is sufficient to obtain the desired results, both pairs of such valves may, if desired, be regulated.

Thus, it is seen, in accordance with this invention the timing of the opening and closing of the exhaust valves of an internal combustion engine, relative to the strokes of the piston and to the opening and closing of the intake valves, is automatically adjusted responsive to operating conditions of the engine while running and in a manner as to afford regulated compression ratios resulting in controlled compression and peak pressure in the combustion chamber at any load and speed, aids in the starting of the engine, gives lower fuel consumption, permits the use of different and less expensive fuels and prevents overloading of the engine.

While a single embodiment of the invention has been illustrated and described herein, it should be understood, of course, that the foregoing disclosure relates to only a preferred embodiment and that various modifications or alterations may be made therein without departing from the spirit and the scope of the invention as set forth in the appended claims.

What is claimed is:

1. An internal combustion engine comprising a cylinder, a piston mounted to reciprocate in said cylinder to define expansion and compression strokes, inlet and exhaust valves opening into and from said cylinder, and mechanism for opening and closing said valves in predetermined timed relation to each other and to the stroke of said piston, said mechanism including a rocker arm, a shaft mounting said rocker arm for oscillatory movement relative thereto, said rocker arm having one end thereof arranged to contact said exhaust valve for opening and closing the same and an opposite end thereof having a cam follower thereon arranged to be contacted by a rotary cam for oscillating said rocker arm, a rotary cam mounted in position to contact said cam follower, means for rotating said cam in timed relation to the reciprocation of said piston to thereby oscillate said rocker arm and through it open and close said exhaust valve in timed relation to the reciprocation of said piston, and eccentric mechanism for varying the relative position of said cam follower and said cam to thereby vary the time of opening and closing said exhaust valve relative to the reciprocation of the piston and thereby vary the compression ratio of the engine while in motion, said eccentric mechanism including a first sleeve having a cylindrical inner surface mounted on the rocker arm shaft for oscillatory movement relative thereto and an eccentric outer surface, a second sleeve fixedly attached to the rocker arm and having an eccentric inner surface thereof mounted on the eccentric outer surface of the first sleeve and means for oscillating the first sleeve relative to the second sleeve.

2. An internal combustion engine as set forth in claim 1 wherein the eccentric mechanism for varying the relative positions of the cam follower and cam includes means for moving one of said elements in substantially a straight line relative to the other to thereby vary the position in the rotation of the cam at which the cam contacts the cam follower.

3. An internal combustion engine as set forth in claim 1 wherein the eccentric mechanism for varying the relative positions of the cam follower and cam includes means for moving the cam follower in substantially a straight line relative to the cam to thereby vary the angle in the rotation of the cam at which the cam contacts and operates the cam follower.

4. An internal combustion engine as set forth in claim 1 which includes an air box for containing air under pressure for delivery through the inlet valve to the cylinder, and wherein the means for oscillating the first sleeve relative to the second sleeve to thereby move the cam follower relative to the cam is operated responsive to the pressure of air in the air box.

5. An internal combustion engine comprising a cylinder, a piston mounted to reciprocate in said cylinder to define expansion and compression strokes, inlet and exhaust valves opening into and from said cylinder, mechanism for opening and closing said valves in timed relation to each other and to the strokes of said piston, and an air box for containing air under pressure for delivery through said inlet valve into said cylinder, at least a part of which air passes through the exhaust valve to thereby scavenge said cylinder, and the remainder of which air is trapped in the cylinder for compression by said piston, said valve mechanism including mechanism operative responsive to the pressure of air in said air box for varying the time of opening and closing said exhaust valve relative to the stroke of the piston to thereby vary the ratio of the amount of air used for scavenging the cylinder and the amount trapped in the cylinder for compression by the piston.

6. An internal combustion engine as set forth in claim 5 wherein the mechanism for opening and closing the exhaust valve includes a rocker arm and a cam for contacting and oscillating the rocker arm, and wherein the mechanism for varying the time of opening and closing the exhaust valve includes means for moving the rocker arm in substantially a straight line relative to the cam to thereby vary the time of contact of the cam with the rocker arm.

(References on following page)

References Cited in the file of this patent

UNITED STATES PATENTS

| | | | |
|---|---|---|---|
| 876,020 | Salter | Jan. 7, | 1908 |
| 1,072,596 | Gardner | Sept. 9, | 1913 |
| 1,100,974 | Harrington | June 23, | 1914 |
| 1,100,975 | Harrington | June 23, | 1914 |
| 1,289,498 | McHarry | Dec. 31, | 1918 |
| 2,088,215 | Podrabsky | July 27, | 1937 |
| 2,148,854 | Bokemuller | Feb. 28, | 1939 |
| 2,447,041 | Sues | Aug. 17, | 1948 |
| 2,565,022 | Hattink | Aug. 21, | 1951 |
| 2,772,667 | Nallinger | Dec. 4, | 1956 |